United States Patent [19]

Ciammaichella et al.

[11] Patent Number: 4,578,583
[45] Date of Patent: Mar. 25, 1986

[54] SOLID STATE ULTRAVIOLET FLAME DETECTOR

[75] Inventors: Richard C. Ciammaichella, Chardon; Barry J. Youmans, Rittman, both of Ohio

[73] Assignee: The Babcock & Wilcox Company, New Orleans, La.

[21] Appl. No.: 596,483

[22] Filed: Apr. 3, 1984

[51] Int. Cl.$^4$ .............................................. G01J 1/42
[52] U.S. Cl. .................................. 250/339; 250/370; 250/372
[58] Field of Search .................... 250/370.01, 370.12, 250/372, 339; 340/577, 578

[56] References Cited

U.S. PATENT DOCUMENTS

| | | | |
|---|---|---|---|
| 3,506,830 | 4/1970 | Love, III et al. | 250/370 |
| 4,016,424 | 4/1977 | Traina | 250/372 |
| 4,065,672 | 12/1977 | Harpster | 250/372 |

Primary Examiner—Janice A. Howell
Attorney, Agent, or Firm—Vytas R. Matas; Robert J. Edwards

[57] ABSTRACT

A flame detector comprises a light collecting lens or other device for collecting electromagnetic radiation from a flame's source, a filter for passing only a portion of the electromagnetic radiation from the lens which changes from between a flame on and a flame off condition, a solid state photocell for receiving the portion of electromagnetic radiation passed by the filter, and a circuit for producing a signal indicative of whether the flame is on or off in response to a signal generated by the photocell. The photocell is preferably sensitive to ultraviolet radiation to avoid confusion with infrared radiation that is produced by heat near the flame's source and which heat is not necessarily indicative of whether the flame is on or off. Such a photocell can preferably be made of Gallium Arsenide Phosphide semiconductor material.

4 Claims, 4 Drawing Figures

SOLID STATE ULTRAVIOLET FLAME DETECTOR

FIELD AND BACKGROUND OF THE INVENTION

The present invention relates in general to light detectors and, in particular, to a new and useful solid state detector for detecting the ultraviolet radiation of a flame to determine whether the flame is on or off.

The safe operation of multiburner boilers is dependent upon instrumentation to verify the presence of flame at each burner. For certain gaseous fuels (i.e., natural gas, methane, hydrogen, CO, etc.) the by-product of the flame which is usually sensed is the ultraviolet radiation (UV) which is emitted during combustion. Previous instrumentation to sense this UV consisted of photosensitive tubes which enclosed metal electrodes within a partially evacuated glass envelope. When the electrodes are connected across a source of electrical potential (typically 300–1000 volts) and a photon of light strikes the electrodes, the tube conducts current from one electrode to the other.

There are several shortcomings associated with tube type detectors.

Tube sensitivity and spectral response are difficult to control; therefore, tubes of like design may be unequal in their ability to monitor a flame.

The tubes reliability is low since they are fragile and age rapidly when exposed to heat or strong light. The life of a tube is limited by the rate of air infiltration through the glass wall and at the glass to metal seals of the electrodes, neither of which are perfect.

A high potential of several hundred volts is required to operate most such tubes. This potential is a safety hazard and poses unique material selection problems for transmission and termination components of the system.

The tubes are prone to fail in an unsafe mode. For example, small amounts of electrical leakage in the tube or supply voltage system will cause a "flame on" signal when no flame is present. Mechanical shock can also cause a false flame on signal due to electrode movement. Expensive and unreliable electro-mechanical shutters therefore must be used to block radiation to the cell in order to prove that they have not failed in an unsafe mode.

The tubes are becoming very expensive due to lower production as various UV measuring applications adopt solid state sensors.

Solid state silicon photocells with enhanced UV sensitivity have been tested for use as a flame detector (since 1977), but have failed. Failure is attributed to the fact that although the cells are sensitive to UV in the spectra of interest, their infrared response is many orders of magnitude greater than their UV response. Since a boiler outputs 10,000 times more IR (interference) than UV, the signal to noise ratio using silicon cells with the best available filters is too low to be acceptable.

SUMMARY OF THE INVENTION

The present invention differs from previous flame detectors in that a solid state photocell and a visible absorption glass filter are used to sense the ultraviolet radiation which is emitted by a flame. The sensor is constructed of Gallium Arsenide Phosphide (GaAsP) semiconductor material (by Hammamatsu Corp.) and the filter of doped glass (by Corning Glass Co.). Both are inexpensive standard products. The advantage of the GaAsP photocell is that it is insensitive to radiation of wavelength longer than 700 nanometers. This insensitivity reduces long wave interference and allows the use of common glass absorption type filters to tune the response of the sensor to the flame.

The combination of a GaAsP photocell and a glass filter provides a usable signal with the following benefits over previous designs:

High reliability common to solid state devices (MTBF 33 yrs.);
Low potential generated poses no safety hazard;
Insensitive to vibration;
Not damaged by strong light;
Consistent performance parameters;
Long life;
Cannot generate a false flame signal;
Lower cost than average UV tube;
Compatible with state of the art integrated circuitry; and
High signal to noise ratio.

Accordingly, an object of the present invention is to provide a solid state flame detector which is capable of detecting whether a flame from a flame source is on or off, and the level of the flame.

The flame sensing arrangement of the invention comprises light collection means, a filter which passes only that portion of the electro-magnetic spectrum which differs between flame on and flame off conditions, and a solid state photocell which converts the desired spectra to an electrical signal. The light collection means may include sighting aids such as reflective vanes, light pipes, prisms, fiber optics and/or optical lenses, depending upon the requirements of a particular burner application. Due to the photocell selection and proper sighting, the filter can be an inexpensive light absorbing type or could be a more expensive and environmentally sensitive interference filter. The photocell must have a sufficiently high band-gap energy to be insensitive to radiation with wavelengths longer than 700 nanometers. The only material which has thus far been demonstrated to perform satisfactorily is GaAsP.

These components of the invention must be arranged so as to maximize the flame radiation which impinges upon the photocell, through the filter. The photocell is slightly overfilled to offset vibration and assembly misalignment effects The photocell signal is fed to a high gain, high impedance amplifier through a shielded cable. This amplifier converts the short circuit current from the photocell to a high level millivolt signal for further electronic manipulation and amplification. The electronics output an analog signal of relative flame intensity and a logic signal which indicates presence or absence of flame at an individual burner in a furnace. Both small ignitor flames and large main utility flames can be detected and discriminated from boiler fire with the invention. No visible indication of flame is necessary for operation although longer wavelength radiation does not prevent operation of the invention.

A further object of the invention is to provide a flame detector which is simple in design, rugged in construction and economical to manufacture.

The various features of novelty which characterize the invention are pointed out with particularity in the claims annexed to and forming a part of this disclosure. For a better understanding of the invention, its operating advantages and specific objects attained by its uses, reference is made to the accompanying drawings and descriptive matters in which preferred embodiments of the invention are illustrated.

DESCRIPTION OF THE PREFERRED EMBODIMENT

Figure 1:
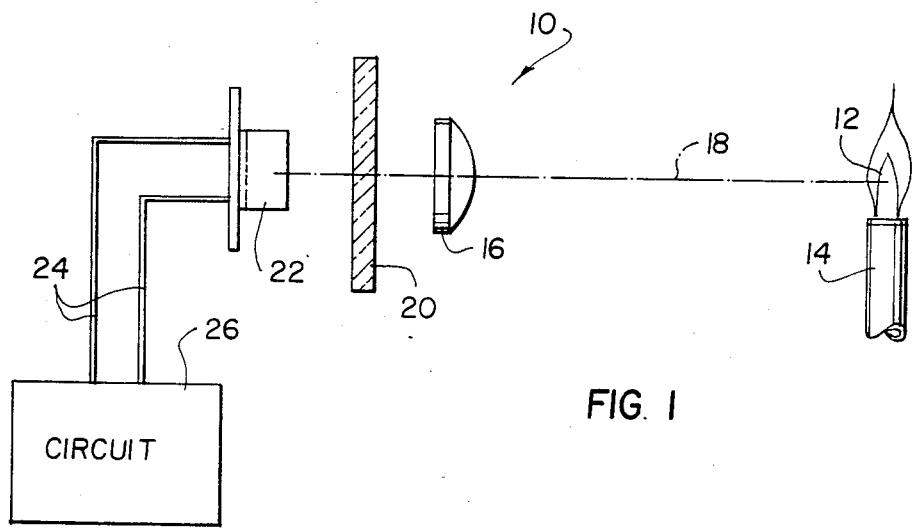
FIG. 1 is a schematic illustration of the flame detector in accordance with the invention.

Referring to the drawings in particular, the invention embodied in FIG. 1 comprises a flame detector generally designated 10 for detecting the presence or absence of a flame 12 from a burner 14 which acts a flame source.

The detector comprises a quartz glass lens 16 which has an optical axis 18 and forms light collection means for collecting light of various wavelengths from the flame 12. Lens 16 must, at least, be capable of collecting light of a particular wavelength which is indicative of a flame on or a flame off condition.

Filter means in the form of filter 20 is provided on the optical axis 18 and is preferably formed of doped glass. Filter 20 may be formed of any material which passes only electromagnetic radiation which changes from a flame on to a flame off condition. Such radiation is preferably of the ultraviolet type to avoid confusion with infrared radiation produced by heat and which would not necessarily change from the flame on to the flame off condition.

A solid state photocell 22 is provided on the optical axis for receiving portion of electromagnetic radiation passed by filter 20. A sensed light signal is generated by photocell 20 and supplied over wires 24 to circuit means 26 which processed a signal to produce a flame on or other appropriate signal which is indicative of whether flame source or burner 14 is producing a flame 12, the level of the flame and also whether only a pilot flame which may normally also be associated with burner 14, is present.

Figure 2:
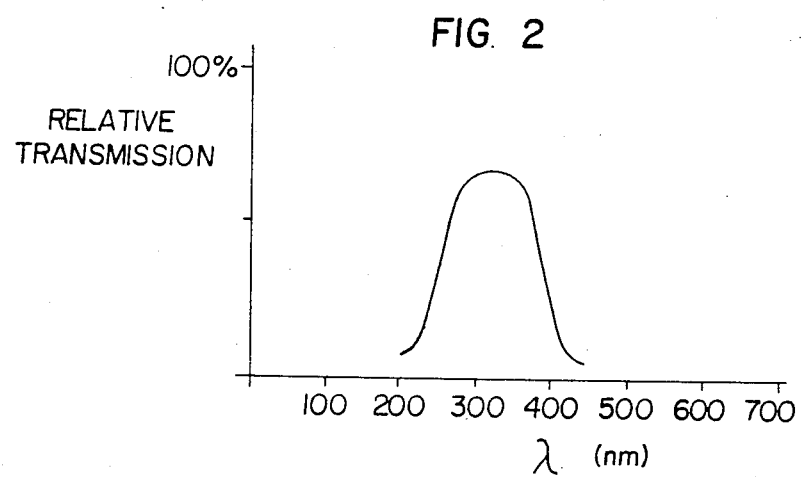
FIG. 2 is a graph showing the sensitivity of a filter used in accordance with the invention to electromagnetic radiation of different wavelengths.

As shown in FIG. 2, the characteristics of filters and semiconductors photosensor 22 permit the passage of ultraviolet radiation but not of radiation having higher wavelength.

Figure 3:
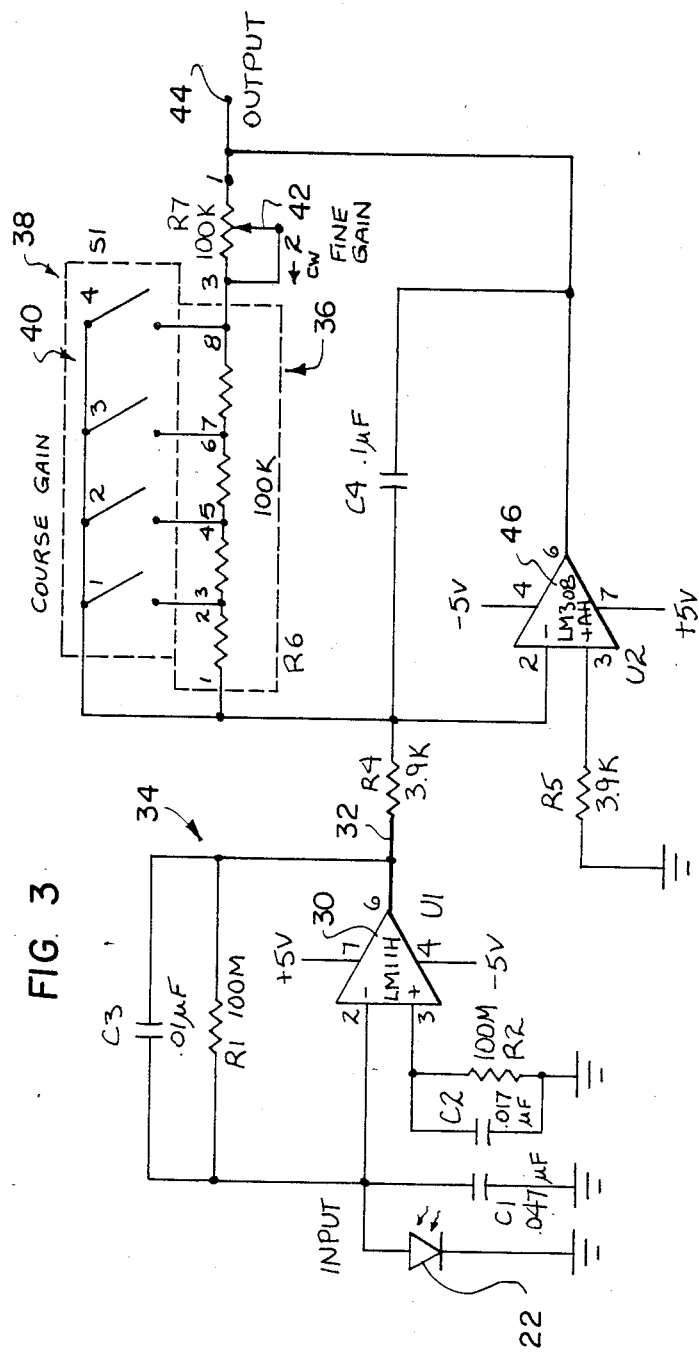
FIG. 3 is a schematic diagram of a circuit used in accordance with the invention.

An amplifying circuit to be incorporated into circuit means 26 is illustrated in FIG. 3. Photocell 22 is shown connected to the negative input terminal of an amplifier 30. The signal from photocell 22 is compared with a standard signal to generate an output signal on line 32 which indicates whether a sensed light signal from photocell 22 has been produced. As shown in FIG. 3, amplifier 30 is provided with a standard feedback loop 34.

A plurality of resistors generally designated 36 are provided in a coarse gain circuit 38 that includes a plurality of switches 40 for selecting one of the resistors at 36. This adjusts the gain, and thus the sensitivity of the circuit. Fine gain is provided by a potentiometer 42 connected to an analog output terminal 44 which can be connected to a logic arrangement for providing a digital signal for a "flame on" or a "flame off" condition, or an analog signal to determine the size of the flame or the presence only of a pilot flame.

Signal processing from line 32 is further achieved in a second amplifier 46.

To reduce noise interference by low current level signal inputs, a capacitance is added to the input and feeback sections of amplifier 30 as shown in FIG. 3.

Photocell 22 is connected to the input of preamplifier 34 and to ground. Opamp 30 is configured in a current to voltage mode by resistor R1. The opamp has input current (into or out of its pin 2) much lower than the photocell 22 signal current that is induced by the flame being viewed. By the circuit's operation the current from the photocell is forced to travel through resistor R1 giving a voltage at 32 proportional to the flame-induced signal current in the photocell capacitor C1 and bypasses to ground much of the noise induced on the wire or cable between the photocell 22 and amplifier 34. Capacitor C3 limits the high frequency response thus reducing noise in the range above the desired signals. Capacitor C2 balances these so that both inputs of opamp 30 have the same capacity to ground.

Circuit 38 provides a variable gain to the analog signal and a low impedance signal at 44 to drive subsequent stages. Switch 40 changes the feedback resistor to opamp 46 in fixed steps and variable resistor 42 provides a fine adjustment between the steps. Capacitor C4 provides a high frequency rolloff in the response of the stage, eliminating noise from output 44 while maintaining the desired flame signal.

Figure 4:
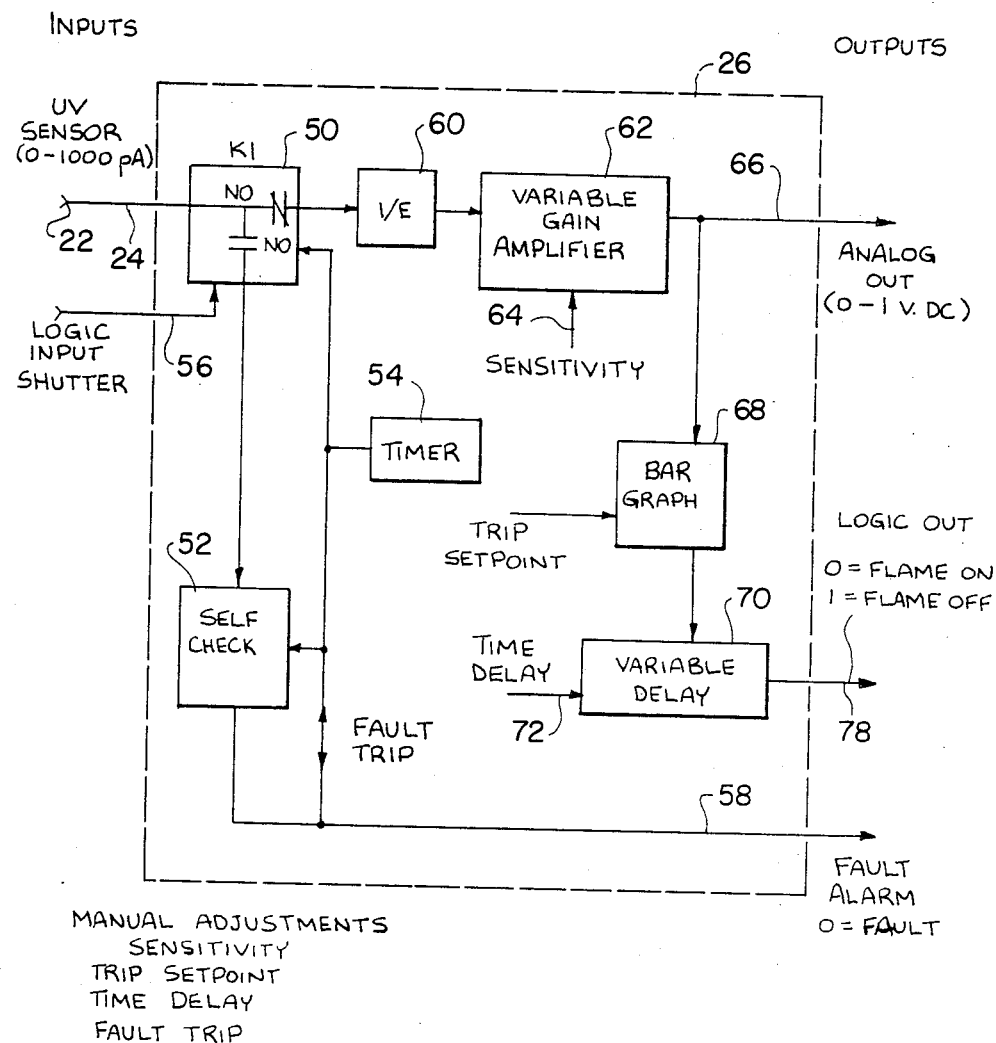
FIG. 4 is a block diagram showing an overall system used in accordance with the invention.

As shown in FIG. 4, circuit means 26 may include a logic block 50 which can be connected to a self-check unit 52 in a loop with a timer 54 for determining the integrity of sensor 22. This circuit is used in conjunction with a logic input shutter 56. If a fault is detected, that is an inappropriate response of sensor 22, a fault signal is produced on fault line 58.

With sensor 22 operating correctly, its sensed light signal is provided over a current/voltage unit 60 to a variable gain amplifier gain 62 having sensitivity which is adjustable at an input 64. The output of amplifier 62 can be provided on lines 66 to a bar graph 68 for making a graphic record of the flame, as well as to an output for determining the magnitude of the flame. Line 66 is also connected to a variable time delay 70 which includes a variable time delay adjustable at terminal 72 and a logic output 78 which produces a 1 or a 0 output, as a digital indication of whether the flame is on or off.

In FIG. 4, sensor 22 is connected to the input of the I/E or current to voltage converter 60 (34 of FIG. 3) via means of relay 50 or alternately to a self check circuit 52 as determined by timer 54 or logic input shutter signal 56. Periodically by the timer 54 or under system or operator initiation by logic input shutter control 56, the relay 50 is switched connecting the sensor to the self-check circuit.

In the self-check test a voltage is placed across the photocell 22 in its reverse-bias directions. Since the photocell 2 normally is an open circuit for small reverse bias voltages, any current flow is due to wiring leakage cable faults or degraded photocell. A threshold level is set on this current and if exceeded a fault trip signal is sent from the module on fault line 58.

The various features of novelty which characterize the invention are pointed out with particularity in the claims annexed to and forming a part of this disclosure. For a better understanding of the invention, its operating advantages and specific objects attained by its uses, reference is made to the accompanying drawings and descriptive matter in which preferred embodiments of the invention are illustrated.

What is claimed is:

1. A flame detector comprising:
   light collection means for collecting electromagnetic radiation from a flame source and having an optical axis;
   filter means lying on said optical axis for receiving electromagnetic radiation collected by said light collection means, and for passing only that portion of the electromagnetic radiation which changes dependent upon whether a flame is present at the flame source;
   a solid state photocell lying on said optical axis and positioned for receiving said portion of the electromagnetic radiation passed by said filter means, said photocell being is made of GaAsP semiconductor material sensitive to said portion of electromagnetic radiation to generate a sensed light signal indicative of one of the flame on and the flame off condition for the flame source; and
   circuit means connected to said photocell for producing one of a flame on and a flame off signal when said photocell generates said sensed light signal.

2. A flame detector according to claim 1 wherein said filter means comprises doped glass which is capable of passing electromagnetic radiation in the ultraviolet wavelength range and of blocking electromagnetic radiation in the infrared range.

3. A photodetector according to claim 1 wherein said light collection means comprises a quartz lens.

4. A flame detector according to claim 1 wherein said circuit means comprises an amplifier for amplifying said sensed light signal to produce an amplified signal, logic means connected to said amplifier for receiving said amplified signal to produce one of the flame on and a flame off digital signal indicative of whether a flame is present at the flame source.

* * * * *